(12) United States Patent
Ghosh et al.

(10) Patent No.: US 7,051,034 B1
(45) Date of Patent: May 23, 2006

(54) DYNAMIC OPTIMIZATION FOR PROCESSING A RESTARTABLE SUB-TREE OF A QUERY EXECUTION PLAN

(75) Inventors: Bhaskar Ghosh, Burlingame, CA (US); Thierry Cruanes, Redwood City, CA (US); Benoit Dageville, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 437 days.

(21) Appl. No.: 10/325,782

(22) Filed: Dec. 18, 2002

(51) Int. Cl.
*G06F 17/30* (2006.01)

(52) U.S. Cl. .................... 707/100; 707/101; 707/104.1
(58) Field of Classification Search ................ 707/1–5, 707/10, 100, 101, 104.1
See application file for complete search history.

(56) References Cited

U.S. PATENT DOCUMENTS

| | | | | |
|---|---|---|---|---|
| 5,301,317 A | * | 4/1994 | Lohman et al. ................. | 707/2 |
| 5,325,525 A | * | 6/1994 | Shan et al. ................. | 718/104 |
| 5,694,591 A | * | 12/1997 | Du et al. ........................ | 707/2 |
| 5,761,654 A | * | 6/1998 | Tow ............................... | 707/2 |
| 5,852,826 A | * | 12/1998 | Graunke et al. ................ | 707/7 |
| 5,857,180 A | * | 1/1999 | Hallmark et al. ............... | 707/2 |
| 6,112,198 A | * | 8/2000 | Lohman et al. ................. | 707/3 |
| 6,341,281 B1 | * | 1/2002 | MacNicol et al. ............. | 707/3 |
| 6,427,032 B1 | * | 7/2002 | Irons et al. .................. | 382/306 |
| 6,785,673 B1 | * | 8/2004 | Fernandez et al. ............. | 707/3 |
| 6,910,032 B1 | * | 6/2005 | Carlson et al. ................ | 707/3 |

(Continued)

OTHER PUBLICATIONS

Hong et al. "Optimization of parallel Query Execution pains in XPRS"—1991—IEEE—(pp.: 218-225).*

(Continued)

*Primary Examiner*—Jean M. Corrielus
*Assistant Examiner*—Anh Ly
(74) *Attorney, Agent, or Firm*—Hickman Palermo Truong & Becker LLP; John D. Henkhaus (57) ABSTRACT

Execution of a restartable sub-tree of a query execution plan comprises determining whether use of parallel processes is a preferred or optimal mode of executing the sub-tree. The determination is based, at least in part, on how long it takes to restart the sub-tree using two or more parallel processes and/or how long it takes to probe the sub-tree, i.e., to fetch a row that meets one or more conditions or correlations associated with the sub-query, using the two or more parallel processes. Thus, a dynamic computational cost-based operation is described, which determines at query runtime whether to execute the restartable sub-tree using a single server process or multiple parallel server processes.

18 Claims, 3 Drawing Sheets

U.S. PATENT DOCUMENTS

| | | | |
|---|---|---|---|
| 2003/0172059 A1* | 9/2003 | Andrei | 707/3 |
| 2003/0229639 A1* | 12/2003 | Carlson et al. | 707/100 |
| 2003/0229640 A1* | 12/2003 | Carlson et al. | 707/100 |
| 2004/0220923 A1* | 11/2004 | Nica | 707/3 |
| 2005/0131877 A1* | 6/2005 | Ghosh et al. | 707/3 |
| 2005/0131890 A1* | 6/2005 | Cruanes et al. | 707/4 |

OTHER PUBLICATIONS

Rao et al. "Reusing Invariants: A New Strategy for Correleated Queries"—1998 ACM (pp.: 37-48).*

Kabra et al. "Efficient Mid-Query Re-Optimization of Sub-Optimal Query Execution Plans"—1998 ACM (pp.: 106-117).*

Ganguly et al. "Query Optimization for parallel Execution"—1992 ACM (pp.: 9-18).*

Oracle Corporation, "Parallel Execution with Oracle9i," An Oracle White Paper, Oct. 2002, pp. 1-25.

Oracle Corporation, "Query Optimization in Oracle9i," An Oracle White Paper, Feb. 2002, pp. 1-30.

* cited by examiner

DYNAMIC OPTIMIZATION FOR PROCESSING A RESTARTABLE SUB-TREE OF A QUERY EXECUTION PLAN

FIELD OF THE INVENTION

The present invention relates generally to database management systems and, more specifically, to techniques for processing a restartable sub-tree of a query execution plan.

BACKGROUND OF THE INVENTION

It is typical for database management systems to include an optimizer program or routine that formulates execution plans for queries submitted to a database. Query execution plans are formulated with a goal of efficiently processing the database query, to optimize usage of various computing resources. Furthermore, query execution plans can have execution plan sub-trees (hereinafter referred to simply as "sub-trees"), some of which can be restarted. For example, restartable sub-trees may be formulated as part of a query execution plan for a query that includes a correlation sub-query or correlation predicate.

A common scenario in which restartable sub-trees are formulated involves probe-type operations, such as FILTER and NESTED-LOOPS JOIN operations. In such an operation, as part of the execution of the query, a row from a data table may flow up from a main or primary sub-tree (sometimes referred to herein as a "left" sub-tree) and probe into another secondary sub-tree (sometimes referred to herein as a "right" sub-tree) to test a condition based on the current row. The following example query illustrates a sub-query with a correlation that is executed as a filter, i.e., a correlation sub-query:

SELECT A.c1, A.c3, A.c4
FROM A
WHERE A.c1 in
(SELECT B.c1 FROM B, C WHERE B.c2=C.c2 and
B.c3=A.c3 and C.c4=A.c4).

In the preceding query, table A can be referred to as the primary table, and tables B and C as the secondary tables. The correlation sub-query includes the following three predicates:

B.c2=C.c2 (a join predicate);
B.c3=A.c3 (a correlation predicate); and
C.c4=A.c4 (a correlation predicate).

Hence, each correlation predicate specifies a correlation between a secondary table and the primary table.

In an execution plan for the preceding query, a left sub-tree might be formulated for a scan of the primary table A and a right sub-tree might be formulated for the correlation sub-query, which includes the join of the secondary tables B and C as well as the correlation predicate between primary table A and secondary table B and the correlation predicate between primary table A and secondary table C. Therefore, during execution of the query, a table scan of table A fetches a row from table A that meets the criteria of the left sub-tree, which is then probed into the right sub-tree to fetch any rows from the join of tables B and C that meet the criteria of the correlation predicates of the right sub-tree.

In executing the query, the right sub-tree is restarted, and rows are fetched, for each probe into the right sub-tree. When parallel processing is utilized for a query, that is, when multiple parallel server processes execute the query, a right sub-tree is likely executed in parallel. In this scenario, for each probe from table A, the right sub-tree representing the correlation sub-query is restarted and executed in parallel. Parallel restart and execution of a sub-tree may not be beneficial in some cases. For example, in situations in which the restart involves significant overhead (i.e., latency) or in which the enhanced speed offered by parallel processing, with respect to the cost-per-fetch, is not appreciable, parallel processing may not benefit the overall query execution.

Parallel processing of some sub-trees may not be optimal because of the latency overhead associated with (1) starting parallel server processes to execute a given sub-tree, and (2) allocating the processes to perform various parts of the given sub-tree, including joining and processing various portions of the secondary tables. Restarting a sub-tree for each probe would incur this latency overhead for each probe into the sub-tree. Another reason that parallel processing of restartable sub-trees may not be beneficial is because the scalability of parallel processing of a given sub-tree, that is, the ability to quickly reach a steady-state of execution for the multiple processes, may not be significant enough to justify using a large number of parallel server processes.

Based on the foregoing, there is a clear need for a mechanism for optimizing the processing of restartable sub-trees of a query execution plan. There is a more specific need for a mechanism to determine whether processing of restartable sub-trees would benefit from parallel processing by multiple server processes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system are described for dynamic optimization of processing of restartable sub-trees of a query execution plan. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The execution plans for some database queries may include sub-trees that are associated with a sub-query, such as a correlation sub-query. During execution of such a query, rows from a primary table are identified and probed into a sub-tree to determine whether a condition is met relative to each row from the primary table and one or more secondary tables that are associated with the sub-tree. That is, it is determined whether a specified correlation exists. Each instance of probing the sub-tree requires restarting the sub-tree.

Numerous advantages are provided by a mechanism for optimizing the processing of restartable sub-trees of a query execution plan and by determining whether processing of restartable sub-trees would benefit from parallel processing by multiple server processes. Additional advantages are provided when such a mechanism is dynamic rather than static, i.e., when determinations are made based on changing conditions rather than decided once and for all at query compilation time.

According to one aspect, a database server determines at query runtime whether use of parallel processes is a preferred, or optimal, mode of executing a restartable sub-tree. The determination is based, at least in part, on how long it takes to restart the sub-tree using two or more parallel processes, i.e., latency, and/or how long it takes to probe the sub-tree, i.e., to fetch a row that meets the condition, using the two or more parallel processes. The cost associated with latency is considered a fixed cost for starting parallel processes; the cost associated with probing a sub-tree is a steady state cost for returning matching rows from a sub-tree.

Thus, a dynamic computational cost-based operation is described, which determines at query runtime whether to execute the restartable sub-tree in serial or in parallel, based on two components of cost, latency cost and probe cost. The operation can be implemented as a two-phased approach, wherein the first phase is governed by the significance of the latency and the second phase is governed by the insignificance of the parallel probe time in comparison to serial processing probe time. Such an operation can be implemented in a scheduler routine, which controls the start and the execution of a sub-tree, such as a sub-tree that has been specified to execute with parallel server processes.

Query Execution Plan with Sub-Tree

Figure 1:
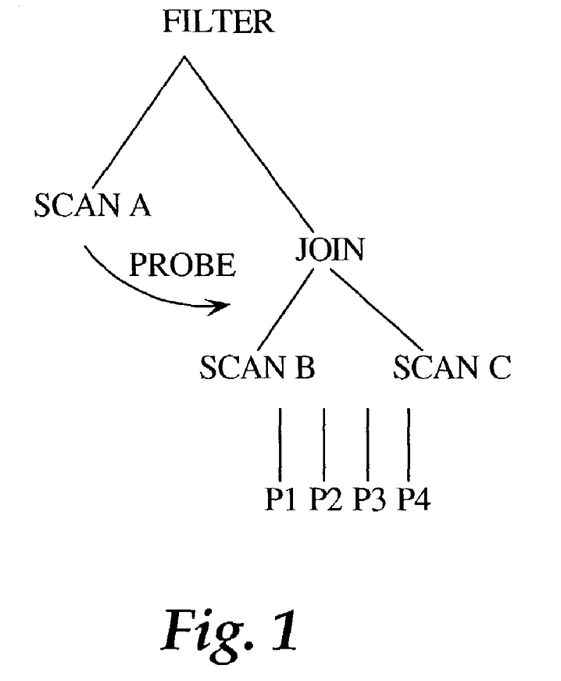
FIG. 1 is a diagram that visually illustrates an example of a query execution plan that includes a restartable sub-tree.

FIG. 1 is a diagram that visually illustrates an example of a query execution plan that includes a restartable sub-tree. The diagram of FIG. 1 relates to the following query:

SELECT A.c1, A.c3, A.c4
FROM A
WHERE A.c1 in
   (SELECT B.c1 FROM B, C WHERE B.c2=C.c2 and
     B.c3=A.c3 and C.c4=A.c4).

FIG. 1 illustrates an execution plan for a sub-query with a correlation predicate that is executed as a filter. A left sub-tree is depicted as the branch with a SCAN A (scan table A) operation and a right sub-tree is depicted as the branch with a JOIN (join of tables B and C) operation and two table scans, SCAN B and SCAN C. Further, evaluation of the correlation predicates between primary table A and secondary tables B and C are depicted as a PROBE of the right sub-tree. The right sub-tree is depicted as being executed with parallel processes P1, P2, P3, P4.

FIG. 1 depicts a scenario for which embodiments described herein can be implemented. Generally, embodiments can be implemented in contexts in which a restartable sub-tree of a query execution plan is present, such as in a probe-type operation. Although not required, use of embodiments might be implemented in contexts which additionally include specification that a correlation sub-query, such as the sub-query depicted in the execution plan of FIG. 1, is to be executed with multiple parallel server processes.

As previously described, during execution of the example query, a table scan of table A fetches a row from table A that meets the criteria of a portion of the query represented by the left sub-tree, which is then probed into the right sub-tree to fetch any rows from the join of tables B and C that meet the criteria of the correlation predicates of the correlation sub-query represented by the right sub-tree. As such, any row from a join of tables B and C on column c2 (B.c2=C.c2) that has equal values in columns c3 of tables A and B (B.c3=A.c3) and equal values in columns c4 of tables A and C (C.c4=A.c4), is fetched via execution of, or a probe of, the right sub-tree of the query execution plan. Recall that each probe of the right sub-tree requires restarting the sub-tree. Furthermore, if the value in column c1 of table B (B.c1 from B, C) for the rows returned from the probe of the right sub-tree is equal to the value in column c1 of table A (WHERE A.c1 in . . . ), then the row meets the left sub-tree condition and values corresponding to columns c1, c3, and c4 of table A (SELECT A.c1, A.c3, A.c4) are returned in response to the query.

Process for Managing Execution of a Correlation Sub-Query

Figure 2:
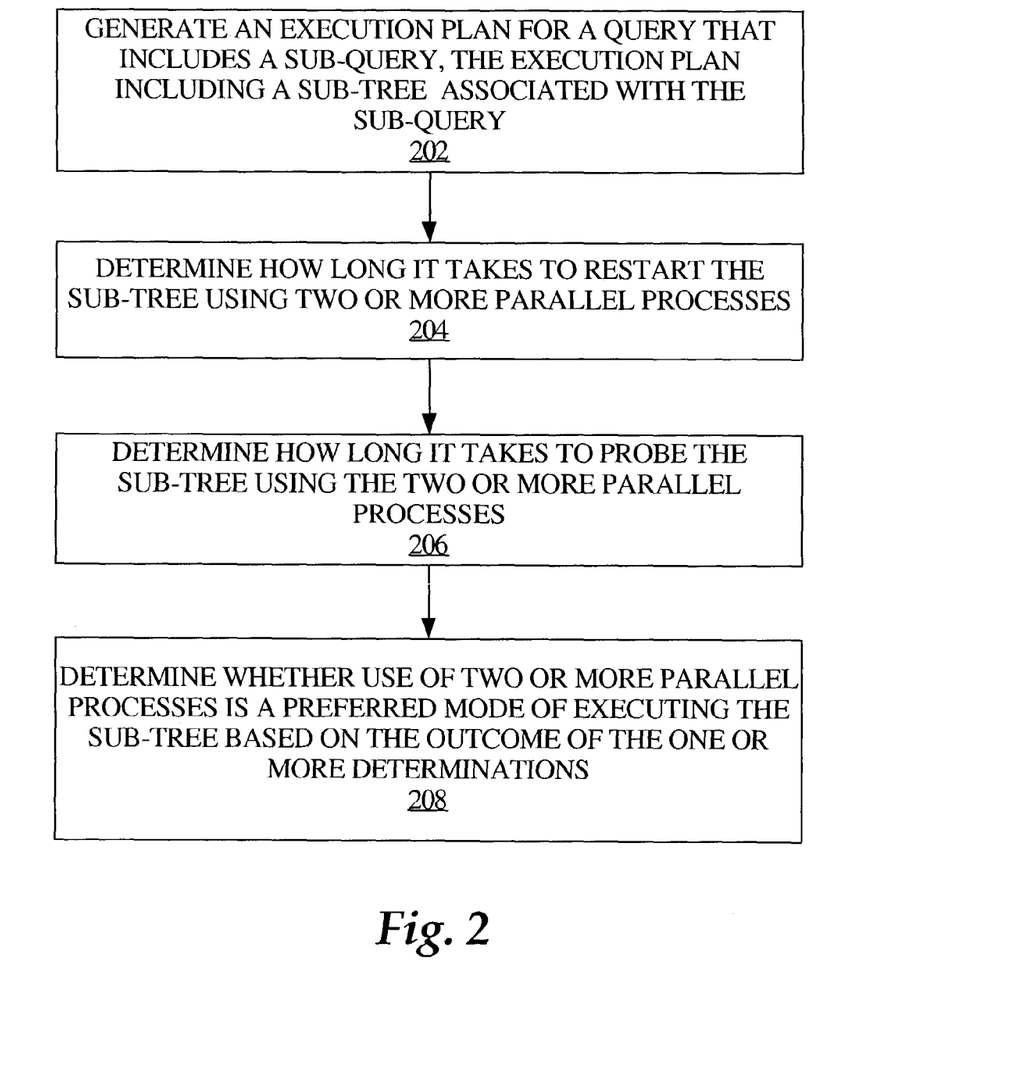
FIG. 2 is a flowchart that illustrates a process for managing execution of a restartable sub-tree of a query execution plan.

FIG. 2 is a flowchart that illustrates a process for managing execution of a restartable sub-tree of a query execution plan. The process of FIG. 2 is described with reference to the example query presented above and described in reference to FIG. 1.

A query is received, such as at a database server, that specifies a first table and a sub-query that includes a correlation predicate. The correlation predicate specifies a correlation between the first table and a second table. For the example query, table A is the first table and table B or table C is the second table and the respective correlations between these tables are (B.c3=A.c3) and (C.c4=A.c4). The query may be in SQL (Structured Query Language) form or according to any other database query language and may comprise one or more queries.

At block 202, a query execution plan is generated for the query. The query execution plan includes a sub-tree associated with the sub-query. For example, a visual depiction of such a query execution plan is illustrated in FIG. 1. Query execution plans are typically generated by an optimizer program, which database management systems often include for optimization of database processing operations. Any conventional or known process may be used to generate the query execution plan.

At block 204, how long it takes to restart the sub-tree using two or more parallel processes is determined. Determining how long it takes to restart the sub-tree may be by measurement and/or computation. The amount of time it takes to restart multiple processes to execute a given sub-tree of a query execution plan depends in part on how long it takes (1) to initiate the parallel server processes to execute a given sub-tree, (2) to allocate the processes to execute various parts of the given sub-tree, including assignment of portions of the second table to process.

In a method described below, how long it takes to restart a sub-tree with multiple parallel server processes is measured with respect to single restarts of the sub-tree. Multiple determinations or measurements of how long it takes to restart the sub-tree may be made, recorded and processed. The measurements are based on a sample number of restart actions.

At block 206, how long it takes to probe the sub-tree using the two or more parallel processes is determined. Determining how long it takes to probe the sub-tree may be by measurement and/or computation. The amount of time it takes to probe the sub-tree depends on how long it takes to return a row that meets the one or more conditions specified in the sub-query to which the sub-tree is associated.

In reference to the example, how long it takes to probe the sub-tree is how long it takes to find and fetch rows from the tables associated with the sub-tree, such as a join of tables B and C, that meet the conditions or correlations of the correlation predicates of the sub-query with respect to the primary table, table A. In a method described below, how long it takes to probe a sub-tree with multiple parallel server processes is measured with respect to single restarts of the sub-tree, that is, for single parallel probes into the sub-tree. Multiple determinations or measurements of how long it takes to probe the sub-tree may be made, recorded and processed. The measurements are based on a sample number of probe actions.

Note that each of the determinations performed at blocks 204 and 206 may be performed alone without the other determination, or may not be performed at all. In other words, blocks 204 and 206 can be restated as performing one or more determinations from a set of determinations that consists of determining how long it takes to restart the sub-tree using parallel processes, and determining how long it takes to probe the sub-tree using parallel processes.

In one embodiment, both determinations are made. That is, how long it takes to restart the sub-tree and how long it takes to probe the sub-tree are both determined.

In one implementation, the process of FIG. 2 is implemented in a scheduler routine which controls the startup and execution of the right sub-tree. Further, using Oracle's SQL execution model, the determinations or measurements of blocks 206 and 208 are implemented such that they are performed by the Parallelizer row-source. These implementation details are presented for example purposes and are not to limit the scope of embodiments of the invention described herein.

At block 208, it is determined whether use of two or more server processes performing in parallel is a preferred mode of executing the sub-tree. This determination is based, at least in part, on the outcome of the one or more determinations made at block 206 and/or at block 208. Consideration of other additional factors in determining whether using multiple parallel processes is the preferred mode of processing a given sub-tree of a query execution plan is specifically contemplated.

In an embodiment, the sub-tree is initially executed using two or more parallel processes for each time that the sub-tree is probed, or restarted. Then, based on the step of determining whether use of parallel processes is the preferred mode, at block 208, the sub-tree is executed using a single process for each time the sub-tree is probed when it is determined that use of parallel processes is not the preferred mode. In other words, parallel processing of the sub-tree is a default mode, typically pursuant to a command or request for parallelism, and measurements are taken at blocks 204 and/or 206 and analyzed to determine whether to remain in parallel mode or to change to serial mode using a single process, at block 208.

In an embodiment, it is determined at block 208 that use of parallel processes is not the preferred mode of processing when it is determined that the sum of an average of how long it takes to restart the sub-tree using two or more parallel processes and an average of how long it takes to probe the sub-tree using the parallel processes is greater than the product of the average of how long it takes to probe the sub-tree using the two or more parallel processes and the number of processes of the two or more parallel processes. Therefore, a single process is subsequently used to probe or execute the sub-tree.

In an embodiment in which the sub-tree is currently being executed using a single process, for example, pursuant to a determination at block 208, it is determined how long it takes to probe the sub-tree using the single process. Then, it is determined that use of parallel processes is a preferred mode of executing the sub-tree based, at least in part, on how long it takes to probe the sub-tree using a single process being greater than the sum of how long it takes to restart the sub-tree using parallel processes and how long it takes to probe the sub-tree using parallel processes.

Likewise, in a related embodiment, it is determined that use of a single process is a preferred mode of executing the sub-tree based, at least in part, on how long it takes to probe the sub-tree using a single process being less than the sum of how long it takes to restart the sub-tree using parallel processes and how long it takes to probe the sub-tree using parallel processes.

In another embodiment in which the sub-tree is currently being executed using a single process for each of a plurality of probes into the sub-tree, it is determined how long it takes to probe the sub-tree using the single process for at least two probes into the sub-tree. Then, it is determined that use of a single process is a preferred mode of executing the sub-tree based, at least in part, on an average of how long it takes to probe the sub-tree using a single process being less than the sum of an average of how long it takes to restart the sub-tree using parallel processes and an average of how long it takes to probe the sub-tree using parallel processes.

The preceding embodiments, and other embodiments, can be represented as follows, where t_parallel=t_start+t_probe;

t_start=startup latency overhead for a single restart of the sub-tree using parallel processes;

t_probe=time for row fetches for a single probe into the sub-tree using parallel processes;

t_serial=time for row fetches for a single probe into the sub-tree using a single process;

DOP (degree of parallelism)=number of parallel server processes used to execute the sub-tree.

An operation of determining whether use of two or more parallel processes is a preferred mode of processing a given restartable sub-tree is represented in pseudo-code as:

```
{
parallel1:
    run sub-tree in parallel (measuring and/or computing t_start and
    t_probe for sample size PQ_SAMPLE_SIZE);
    if (t_start + t_probe > DOP * t_probe) (as such, parallel processing
    is not preferred due to t_start, so try processing the sub-tree in serial
    with a single process);
    then
    {
    serial1:
        continue measuring and/or computing average times of t_serial
        while using a single process and perform the following test;
        if (t_serial > t_start + t_probe) (as such, serial processing with
        a single process is not particularly beneficial);
        then goto parallel2;
        else continue processing the sub-tree in serial mode for
        remainder of query execution;
    }
    else
    {
    parallel2:
        continue for N (some large number) probes into the sub-tree;
        if (t_probe < 5 seconds AND N > 200 * DOP) (as such, the
        operation has been monitoring parallel processing for a sub-
        stantial duration, and t_probe is significantly small such that
```

-continued

```
        serial processing should be performed to determine if benefit of
        parallelism in the steady state is significant enough to choose
        parallel processing over serial processing);
    then
        {
        serial2:
            continue measuring and/or computing average times of
                t_serial while using a single process and perform the
                following test;
            if (t_serial > t_start + t_probe) (as such, serial
                processing of sub-tree is not particularly beneficial);
                then continue processing the sub-tree in parallel mode
                    for remainder of query execution;
                else continue processing the sub-tree in serial mode for
                    remainder of query execution;
        }
    else
        continue processing the sub- tree in parallel mode for
            remainder of query execution;
    }
}
```

The operation embodied in the preceding pseudo-code is a two-stage process; however, both stages need not be implemented. In the first stage, the decision as to whether to change from parallel to serial processing is governed by the significance of the sub-tree startup latency, i.e., how bad the latency is, instead of by probe time. In the second stage, the decision as to whether to change from parallel to serial processing is governed by the insignificance of the parallel probe time in relation to the serial probe time, i.e., how small the parallel probe time is, instead of by the effects of latency.

Both stages have stringent tests to determine whether to even test serial processing because serial processing could take a long time and, therefore, defeat the purpose of the dynamic optimization process. For example, in the second stage (parallel2), it is ensured that the parallel probe is quick (e.g., <5 seconds) and that a significant enough number of parallel probes have been tested (e.g., 200*DOP). Hence, running a serial probe after such a significant number of parallel probes should take at most t_probe*DOP, which will add only DOP/(200*DOP), or 0.5%, to the total running time.

Therefore, a process is provided for improving the performance of restartable sub-trees of a query execution plan by using a single serial process when it is not particularly beneficial to use two or more parallel processes. Generally, if the processing or executing of a restartable sub-tree of a query execution plan using multiple parallel processes tends, over time, toward lengthy sub-tree start times in relation to associated probe times, then it is beneficial to switch to a serial mode of processing the sub-tree with a single server process. On the other hand, if the processing or executing of a restartable sub-tree of a query execution plan using multiple parallel processes tends, over time, toward fast sub-tree start times in relation to lengthy associated probe times, then it is beneficial to continue processing the sub-tree with the multiple parallel server processes. The processes described as embodiments herein are considered dynamic in that they make determinations at query execution runtime and they adapt the execution process to a state of changing conditions with respect to execution of the sub-tree, rather than making a determination at query compilation time and maintaining that execution process indefinitely.

Implementation Mechanism-Hardware Overview

Figure 3:
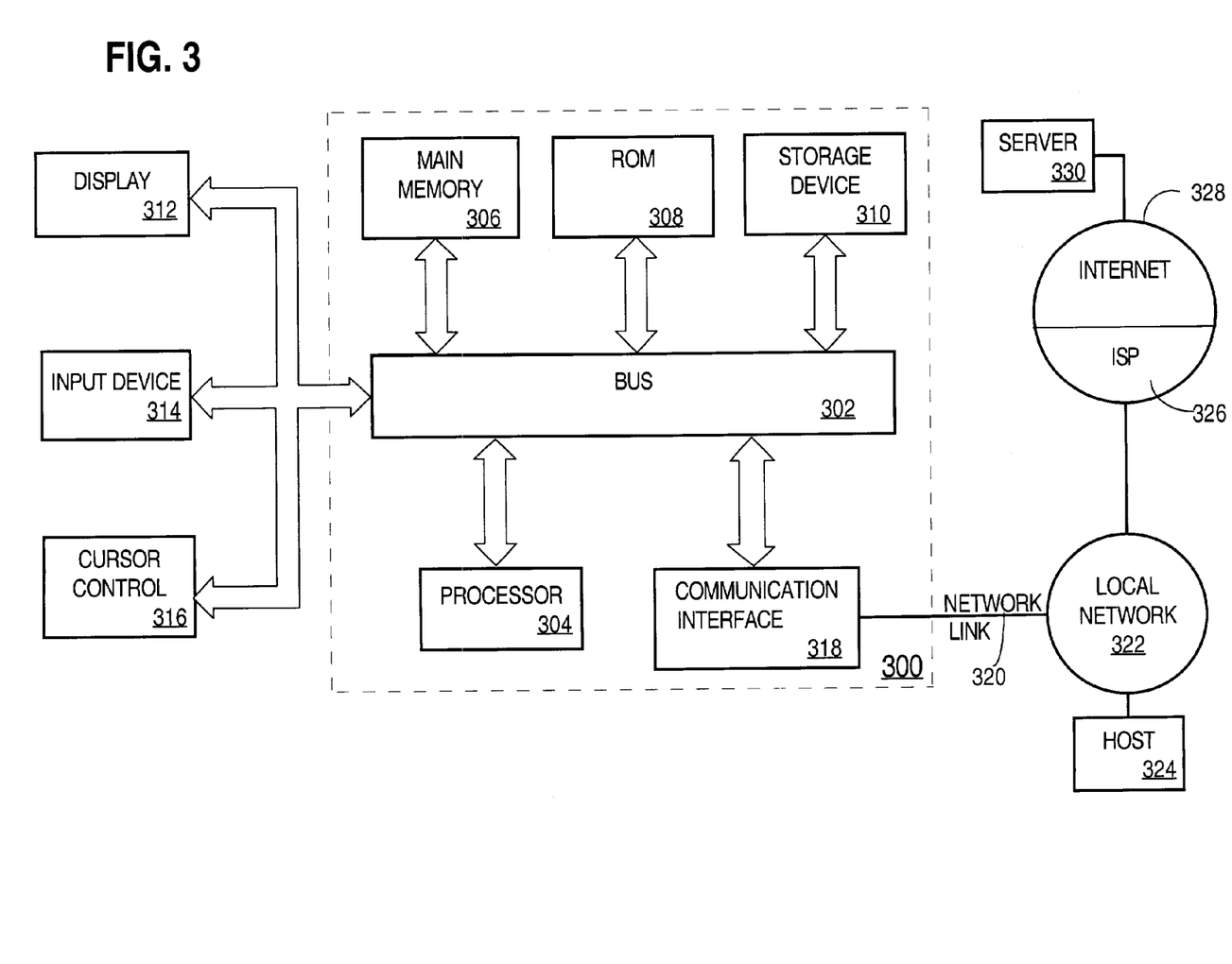
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, embodiments of the invention have been described with reference to specific details. These details may vary from implementation to implementation.

For example, implementations were presented in which SQL is used; however, the techniques described herein are not limited to use with SQL, for other data query languages may be applicable. For another example, certain variables are quantified in the example pseudo-code presented above (e.g., "t_probe<5 seconds" and "N>200*DOP). However, the invention is not limited to the specific values presented, for other values may be specified and still fall within the broader scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for managing execution of a restartable sub-tree of a query execution plan, the method comprising the steps of:

generating a query execution plan for a query that includes a sub-query, wherein the execution plan includes a restartable sub-tree associated with the sub-query;

performing at query execution runtime one or more determinations from a set of determinations that consists of;

determining the amount of time to restart the sub-tree using two or more parallel processes, wherein restarting the sub-tree comprises initiating the two or more parallel processes to execute the sub-tree and allocating the two or more processes to perform various parts of the sub-tree, and determining the amount of time to probe the sub-tree using the two or more parallel processes, wherein probing the sub-tree comprises determining whether a row meets one or more conditions specified in the sub-query to which the sub-tree is associated; and determining at query execution runtime whether using two or more parallel processes is a preferred mode of executing the sub-tree based, at least in part, on the outcome of the one or more determinations.

2. The method of claim 1, wherein the step of performing one or more determinations includes determining the amount of time to restart the sub-tree using two or more parallel processes and determining the amount of time to probe the sub-tree using the two or more parallel processes.

3. The method of claim 1, wherein the query specifies a first table and the sub-query includes a predicate that specifies a correlation between a second table and the first table, and wherein the step of generating the execution plan generates an execution plan for the query.

4. The method of claim 1, further comprising the steps of:
executing the sub-tree using two or more parallel processes each time the sub-tree is probed; and
based on the step of determining whether using two or more parallel processes is the preferred mode, executing the sub-tree using a single process each time the sub-tree is probed when determined that use of two or more parallel processes is not the preferred mode of executing the sub-tree.

5. The method of claim 1, further comprising the steps of:
executing the sub-tree using two or more parallel processes for each of a plurality of instances in which the sub-tree is probed; and
based on the step of determining whether using two or more parallel processes are the preferred mode, executing the sub-tree with a single process when determined that the sum of an average of the amount of time to restart the sub-tree using two or more parallel processes and an average of the amount of time to probe the sub-tree using two or more parallel processes is greater than the product of the average of the amount of time to probe the sub-tree using the two or more parallel processes and the number of processes of the two or more parallel processes.

6. The method of claim 1, further comprising the steps of:
executing the sub-tree using a single process;
determining the amount of time to probe the sub-tree using a single process;
determining that using two or more parallel processes is a preferred mode of executing the sub-tree based, at least in part, on the amount of time to probe the sub-tree using a single process being greater than the sum of the amount of time to restart the sub-tree using two or more parallel processes and the amount of time to probe the sub-tree using two or more parallel processes.

7. The method of claim 1, further comprising the steps of:
executing the sub-tree using a single process;
determining the amount of time to probe the sub-tree using a single process;
determining that using a single process is a preferred mode of executing the sub-tree based, at least in part, on the amount of time to probe the sub-tree using a single process being less than the sum the amount of time to restart the sub-tree using two or more parallel processes and the amount of time to probe the sub-tree using two or more parallel processes.

8. The method of claim 1, further comprising the steps of:
executing the sub-tree using a single process for each of a plurality of instances in which the sub-tree is probed;
determining, for at least two of the plurality of instances, the amount of time to probe the sub-tree using the single process;
determining that a single process is a preferred mode of executing the sub-tree based, at least in part, on an average of the amount of time to probe the sub-tree using a single process being less than the sum of an average of the amount of time to restart the sub-tree using two or more parallel processes and an average of the amount of time to probe the sub-tree using two or more parallel processes.

9. A computer-readable medium carrying one or more sequences of instructions for managing execution of a correlation sub-query, wherein execution of the one or more sequences of instructions by one or more processors causes the one or more processors to perform the steps of:
generating a query execution plan for a query, wherein said query includes a sub-query, and wherein the query execution plan includes a restartable sub-tree associated with the sub-query;
performing at query execution runtime one or more determinations from a set of determinations that consists of determining the amount of time to restart the sub-tree using two or more parallel processes, wherein restarting the sub-tree comprises initiating the two or more parallel processes to execute the sub-tree and allocating the two or more processes to perform various parts of the sub-tree, and
determining the amount of time to probe the sub-tree using the two or more parallel processes, wherein probing the sub-tree comprises determining whether a row meets one or more conditions specified in the sub-query to which the sub-tree is associated; and
determining at query execution runtime whether using two or more parallel processes is a preferred mode of executing the sub-tree based, at least in part, on the outcome of the one or more determinations.

10. The computer-readable medium of claim 9, wherein execution of the one or more sequences of instructions by one or more processors causes the one or more processors to perform the step of performing one or more determinations by determining the amount of time to restart the sub-tree using two or more parallel processes and determining the amount of time to probe the sub-tree using the two or more parallel processes.

11. The computer-readable medium of claim 9, wherein the query specifies a first table and the sub-query includes a predicate that specifies a correlation between a second table and the first table, and wherein execution of the one or more sequences of instructions by one or more processors causes the one or more processors to perform the step of generating the execution plan by generating an execution plan for the query.

12. The computer-readable medium of claim 9, wherein execution of the one or more sequences of instructions by one or more processors causes the one or more processors to perform the steps of:
executing the sub-tree using two or more parallel processes each time the sub-tree is probed; and
based on the step of determining whether using two or more parallel processes is the preferred mode, executing the sub-tree using a single process each time the sub-tree is probed when determined that use of two or more parallel processes is not the preferred mode of executing the sub-tree.

13. The computer-readable medium of claim 9, wherein execution of the one or more sequences of instructions by one or more processors causes the one or more processors to perform the steps of:
executing the sub-tree using two or more parallel processes for each of a plurality of instances in which the sub-tree is probed; and
based on the step of determining whether using two or more parallel processes is the preferred mode, executing the sub-tree with a single process when determined the sum of an average of the amount of time to restart the sub-tree using two or more parallel processes and an average of the amount of time to probe the sub-tree using two or more parallel processes is greater than the product of the average of the amount of time to probe the sub-tree using the two or more parallel processes and the number of processes of the two or more parallel processes.

14. The computer-readable medium of claim 9, wherein execution of the one or more sequences of instructions by one or more processors causes the one or more processors to perform the steps of:

executing the sub-tree using a single process;

determining the amount of time to probe the sub-tree using a single process;

determining that using two or more parallel processes is a preferred mode of executing the sub-tree based, at least in part, on the amount of time to probe the sub-tree using a single process being greater than the sum of the amount of time to restart the sub-tree using two or more parallel processes and the amount of time to probe the sub-tree using two or more parallel processes.

15. The computer-readable medium of claim 9, wherein execution of the one or more sequences of instructions by one or more processors causes the one or more processors to perform the steps of:

executing the sub-tree using a single process;

determining the amount of time to probe the sub-tree using a single process;

determining that using two or more parallel processes is a preferred mode of executing the sub-tree based, at least in part, on the amount of time to probe the sub-tree using a single process being greater than the sum of the amount of time to restart the sub-tree using two or more parallel processes and the amount of time to probe the sub-tree using two or more parallel processes.

16. The computer-readable medium of claim 9, wherein execution of the one or more sequences of instructions by one or more processors causes the one or more processors to perform the steps of:

executing the sub-tree using a single process for each of a plurality of instances in which the sub-tree is probed;

determining, for at least two of the plurality of instances, the amount of time to probe the sub-tree using the single process;

determining that using a single process is a preferred mode of executing the sub-tree based, at least in part, on an average of the amount of time to probe the sub-tree using a single process being less than the sum of an average of the amount of time to restart the sub-tree using two or more parallel processes and an average of the amount of time to probe the sub-tree using two or more parallel processes.

17. An apparatus for managing execution of a correlation sub-query, comprising:

means for generating a query execution plan for a query, wherein said query includes a sub-query, and wherein the query execution plan includes a restartable sub-tree associated with the sub-query;

means for performing at query execution runtime one or more determinations from a set of determinations that consists of determining the amount of time to restart the sub-tree using two or more parallel processes, wherein restarting the sub-tree comprises initiating the two or more parallel processes to execute the sub-tree and allocating the two or more processes to perform various parts of the sub-tree, and determining the amount of time to probe the sub-tree using the two or more parallel processes, wherein probing the sub-tree comprises determining whether a row meets one or more conditions specified in the sub-query to which the sub-tree is associated; and means for determining at query execution runtime whether using two or more parallel processes is a preferred mode of executing the sub-tree based, at least in part, on the outcome of the one or more determinations.

18. A computer apparatus, comprising:

a memory; and one or more processors coupled to the memory and configured to execute one or more sequence of instructions for managing execution of a correlation sub-query, wherein execution of the one or more sequences of instructions by one or more processors causes the one or more processors to perform the steps of:

generating a query execution plan for a query, wherein said query includes a sub-query, and wherein the query execution plan includes a restartable sub-tree associated with the sub-query;

performing at query execution runtime one or more determinations from a set of determinations that consists of determining the amount of time to restart the sub-tree using two or more parallel processes, wherein restarting the sub-tree comprises initiating the two or more parallel processes to execute the sub-tree and allocating the two or more processes to perform various parts of the sub-tree, and determining the amount of time to probe the sub-tree using the two or more parallel processes, wherein probing the sub-tree comprises determining whether a row meets one or more conditions specified in the sub-query to which the sub-tree is associated; and determining at query execution runtime whether using two or more parallel processes is a preferred mode of executing the sub-tree based, at least in part, on the outcome of the one or more determinations.

* * * * *

UNITED STATES PATENT AND TRADEMARK OFFICE
CERTIFICATE OF CORRECTION

PATENT NO.        : 7,051,034 B1                                    Page 1 of 1
APPLICATION NO.   : 10/325782
DATED             : May 23, 2006
INVENTOR(S)       : Bhaskar Ghosh et al.

It is certified that error appears in the above-identified patent and that said Letters Patent is hereby corrected as shown below:

Column 13
Claim 15: Line 18, delete "two or more parallel processes" and insert --a single process--.

Claim 15: Line 21, delete "being greater" and insert --being less--.

Signed and Sealed this

Sixth Day of November, 2007

JON W. DUDAS
*Director of the United States Patent and Trademark Office*